United States Patent
Herring et al.

(10) Patent No.: US 8,874,713 B1
(45) Date of Patent: Oct. 28, 2014

(54) LOCATION CORRECTION

(75) Inventors: Fiona Herring, Zurich (CH); Krzysztof Duleba, Zurich (CH); Keekim Heng, Zurich (CH); Luuk Van Dijk, Zurich (CH); Bernhard Seefeld, New York, NY (US)

(73) Assignee: Google Inc., Mountain View, CA (US)

( * ) Notice: Subject to any disclaimer, the term of this patent is extended or adjusted under 35 U.S.C. 154(b) by 331 days.

(21) Appl. No.: 13/031,150

(22) Filed: Feb. 18, 2011

(51) Int. Cl.
  *G06F 15/173* (2006.01)
  *H04W 4/02* (2009.01)
  *G01C 21/30* (2006.01)
  *G01C 21/34* (2006.01)

(52) U.S. Cl.
  CPC ............ *H04W 4/02* (2013.01); *G01C 21/30* (2013.01); *G01C 21/34* (2013.01)
  USPC ............ 709/223; 701/411; 701/445; 701/534

(58) Field of Classification Search
  USPC .................................. 709/223–225; 701/411
  See application file for complete search history.

(56) References Cited

U.S. PATENT DOCUMENTS

| | | | |
|---|---|---|---|
| 5,945,948 A * | 8/1999 | Buford et al. ................. | 342/457 |
| 6,684,250 B2 * | 1/2004 | Anderson et al. ............. | 709/225 |
| 7,072,963 B2 * | 7/2006 | Anderson et al. ............. | 709/225 |
| 7,406,071 B1 * | 7/2008 | Tang et al. .................... | 370/352 |
| 7,469,827 B2 * | 12/2008 | Katragadda et al. .......... | 235/384 |
| 7,937,336 B1 * | 5/2011 | Maynard-Zhang et al. .... | 706/12 |
| 8,144,611 B2 * | 3/2012 | Agarwal et al. ............... | 370/252 |
| 2004/0107285 A1 * | 6/2004 | Larson et al. ................ | 709/229 |
| 2005/0071417 A1 * | 3/2005 | Taylor et al. ................. | 709/200 |
| 2005/0246334 A1 * | 11/2005 | Tao et al. ....................... | 707/5 |
| 2006/0282660 A1 * | 12/2006 | Varghese et al. ............. | 713/155 |
| 2007/0104183 A1 * | 5/2007 | Bakke et al. ................. | 370/352 |
| 2008/0214157 A1 * | 9/2008 | Ramer et al. ............. | 455/414.1 |
| 2009/0006211 A1 * | 1/2009 | Perry et al. .................... | 705/14 |
| 2010/0263041 A1 * | 10/2010 | Shea .............................. | 726/14 |
| 2010/0287178 A1 * | 11/2010 | Lambert et al. .............. | 707/765 |
| 2012/0102169 A1 * | 4/2012 | Yu et al. ...................... | 709/223 |

OTHER PUBLICATIONS

Popescu, A., "Geolocation API Specification", Feb. 10, 2010, accessed from http://dev.w3.org/geo/api/spec-source.html, accessed on Nov. 1, 2011; 18 pages.

Caceres, M., "Widgets 1.0: The Widget Landscape", Apr. 14, 2008, accessed from http://www.w3.org/TR/2008/WD-widgets-land-20080414/, accessed on Aug. 26, 2010; 33 pages.

"Widget engine", accessed from http://en.wikipedia.org/wiki/Widget_engine last modified on Aug. 21, 2010, and accessed on Aug. 26, 2010; 4 pages.

* cited by examiner

*Primary Examiner* — Rupal Dharia
*Assistant Examiner* — Joe Chacko
(74) *Attorney, Agent, or Firm* — Marshall, Gerstein & Borun LLP

(57) ABSTRACT

Methods and systems for location correction are provided. In one exemplary method, a first routing identifier of a first location associated with a location correction may be identified. The first location and the first routing identifier may be stored. A second routing identifier associated with a location request may be identified. A second location based at least in part on a comparison of the first routing number and the second routing number may be predicted. Finally, the location request may be responded to with the second location.

11 Claims, 9 Drawing Sheets

LOCATION CORRECTION

FIELD

The field relates to location and location-based systems, methods and applications.

BACKGROUND

Software applications, such as location-based applications, may attempt to utilize a user's present location as an integral part of their functionality. A trip planner application, for example, may attempt to use a user's current location to provide accurate directions, transit schedules, and nearby landmarks. An astronomy application may attempt to use a user's current location to provide an accurate portrayal of the night sky from the user's perspective.

Conventional location-based applications, however, may not know where a user is currently located, nor have the ability to make an accurate location prediction. Other location-based applications may suffer from ineffective methods for predicting a user's current location. Imprecise predictions or uninformed guesses of a user's current location may hamper the user experience, as well as reduce an application's effectiveness. Users may become frustrated with repeated corrections, or may not even be able to accurately correct their location when lost.

BRIEF SUMMARY

Embodiments relate to location correction. In one embodiment, a method for location correction may include identifying a first routing identifier of a first location associated with a location correction. The method may also include storing the first location and the first routing identifier. The method may further include identifying a second routing identifier associated with a location request. The method may also include predicting a second location based at least in part on a comparison of the first routing identifier and the second routing identifier. The method may also include responding to the location request with the second location.

In another embodiment, a system for correcting a predicted location is provided. The system may include an identifier that identifies a routing identifier of a first location associated with a location correction and identifies a second routing identifier of a location request. The system may further include a location storage that stores the first location and the first routing identifier associated with the first location. The system may further include a location predictor that predicts a second location based at least in part on a comparison of the first routing identifier and the second routing identifier. The system may also include a location responder that responds to the location request with the second location.

In one embodiment, a computer program product includes a computer readable storage medium having control logic stored therein for causing a computer to correct a predicted location. The control logic may include a first computer readable program code that identifies a first routing identifier of a first location associated with a location correction and a second computer readable program code that stores the first location and the first routing identifier. The control logic may further include a third computer readable program code that identifies a second routing identifier associated with a location request. The control logic may also include a fourth computer readable program code that predicts a second location based at least in part on a comparison of the first routing identifier and the second routing identifier. The control logic may further include a fifth computer readable program code that responds to the location request with the second location.

Further embodiments, features, and advantages, as well as the structure and operation of the various embodiments, are described in detail below with reference to the accompanying drawings.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

FIG. 1 is an illustration of a user interface for location correction according to an embodiment.

FIGS. 2a, 2b, and 2c are illustrations of a user interface for location correction according to an embodiment.

Figure 1:
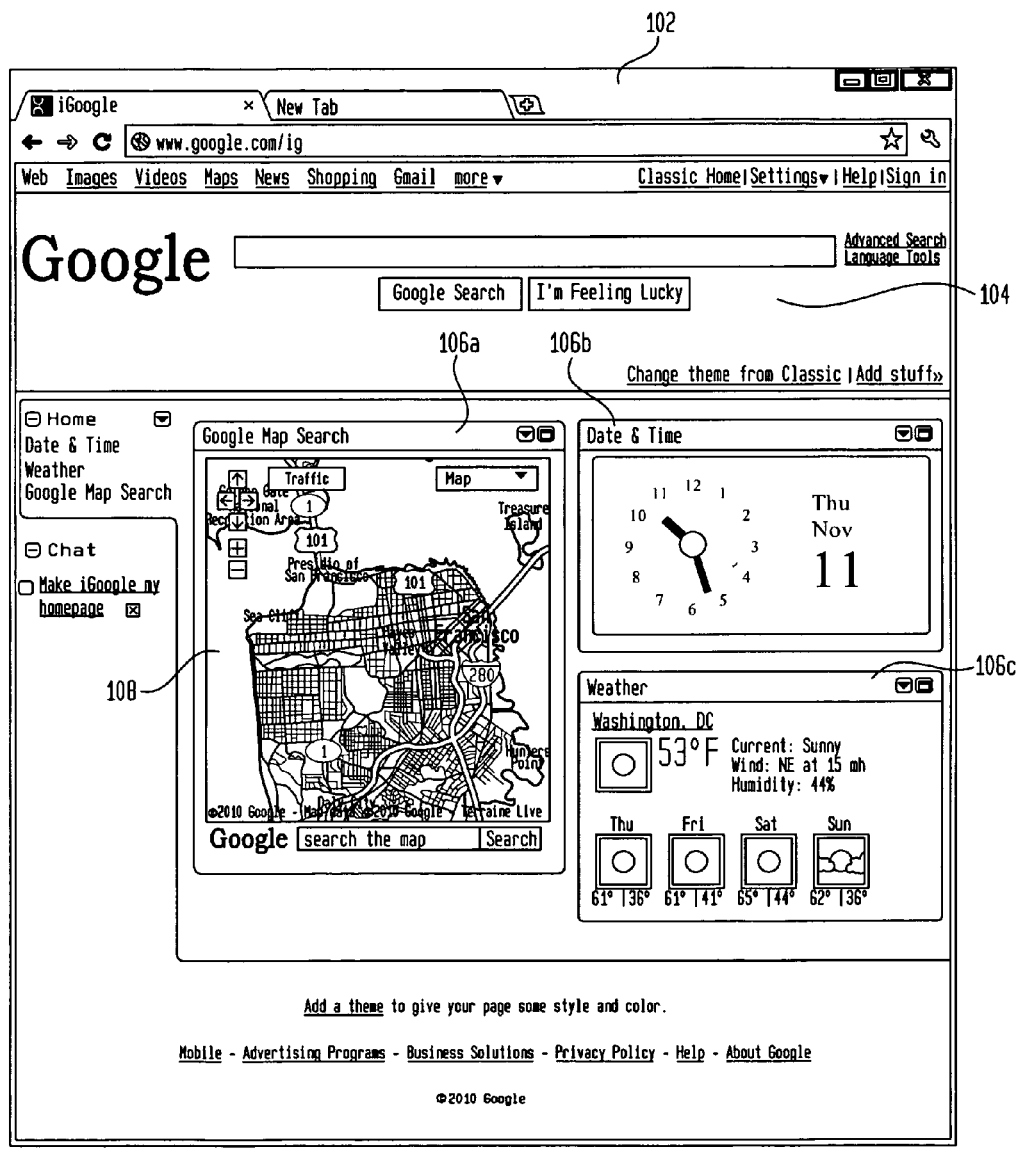

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

It is noted that references in the specification to "one embodiment," "an embodiment," "an example embodiment," etc., indicate that the embodiment described may include a particular feature, structure, or characteristics, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of one skilled in the art to incorporate such a feature, structure, or characteristic in common with other embodiments whether or not explicitly described.

Terminology

The following provides definitions for certain terms as used in this document.

Autonomous System—An autonomous system (AS) is a connected group of one or more Internet Protocol (IP) routing prefixes under the control of one or more network operators that presents a common, clearly defined routing policy to the Internet. An autonomous system may utilize one or more interior routing protocols and policies. However, from an outside perspective, the autonomous system may appear to have a single coherent interior routing plan and present a consistent picture of what destinations are reachable through it. Examples of autonomous systems may include Internet Service Providers (ISPs), college campus networks, government networks, and/or corporate networks. Each autonomous system may communicate with each other via an inter-domain routing protocol, such as the border gateway protocol (BGP) (e.g. Version 4 of the Border Gateway Protocol), or other protocol.

Autonomous System Number (ASN)—An autonomous system number (ASN) is a globally unique identifier assigned to an autonomous system. Each autonomous system that connects to the Internet may be assigned an ASN. An ASN may be used for inter-domain routing, e.g. in exchange of exterior routing information, and as an identifier of the AS itself. In an embodiment, a routing identifier may be an ASN.

Example of Location Correction

Various embodiments include methods and systems for location correction. Location-based software applications may include stand-alone applications, mobile applications (e.g. apps), and/or software widgets or gadgets, which may execute on a desktop or a web browser, such as in a web portal. Such location-based applications may provide particular location-based information and/or functionality to a user. In one example, a web portal, such as iGoogle, may include a location-based gadget, such as a map gadget, that displays an interactive map. In order to provide accurate location-based services, it may be advantageous for the map to be centered on or near the user's current location.

A user may load the web portal including the map gadget on a mobile computing device. In order to initialize the map view, the map gadget may request the user's current location by generating a location request. The user's current location may then be predicted based on information associated with the location request, such as an IP address of the mobile computing device. If the location prediction is inaccurate, a user may want to designate a different current location (e.g. a corrected location) through a location correction. A location correction can be generated, for example and without limitation, by dragging a marker to a new position on the map, or entering an address. These and other corrected locations may then be stored in a location storage. When a location correction is received, a routing identifier associated with the network domain of the user's mobile device may be identified. The identifier, for example an ASN, may then be stored with the corrected location. Associating user provided location corrections with routing identifiers may enable intelligent application of multiple corrections to future location requests.

After one or more corrected locations have been stored, a user may load the web portal and map gadget from the same location, or possibly from a different location and/or different computing device. The current location of the user may then be more accurately predicted based on previously recorded location corrections. A routing identifier associated with a new location request may be identified, and compared with previously stored routing identifiers. If the new routing identifier matches a stored routing identifier associated with a corrected location, then the corrected location may be used to predict the user's current location.

Illustrated User Interfaces for Location Correction

FIG. 1 is an illustration of a user interface for location correction according to an embodiment. As shown in the screen shot 100, a web portal 104 may be accessed by a web browser 102. Web browser 102 may include any interne browser for use on a network device, such as and without limitation, Google Chrome, Mozilla Firefox, or Internet Explorer. As shown in FIG. 1, web portal 104 may be the iGoogle web portal.

In an embodiment, web portal 104 may include a customizable interface with one or more gadgets. As shown in FIG. 1, web portal 104 may include a map gadget 106a, a date and time gadget 106b, and a weather gadget 106c. Each gadget may present dynamic information to a user through a common interface, such as web browser 102. In other embodiments, applications such as location-based applications may be located in a taskbar, integrated into a desktop (e.g. desktop gadget) or be stand-alone applications.

Map gadget 106a may display a map 108. Map 108 may be a street map, a topographical map, a satellite map, a hybrid/combination map, or some other type of map. Map 108 may be static or dynamic, and may accept user interaction, such as with zoom controls, arrow controls, search bars, and/or dragging.

When a location-based application is loaded, the location-based application may generate a request for its current location. For example, when web portal 104 with map gadget 106a is loaded by browser 102, a location request for the user's current location may be generated. A prediction of the user's current location may then be used to determine the initial position of map 108. Starting at an accurate initial location may be advantageous for providing more accurate information, better-targeted advertising, etc. However, since the user's current location may not be known, embodiments may predict the user's current location.

Figure 2A:
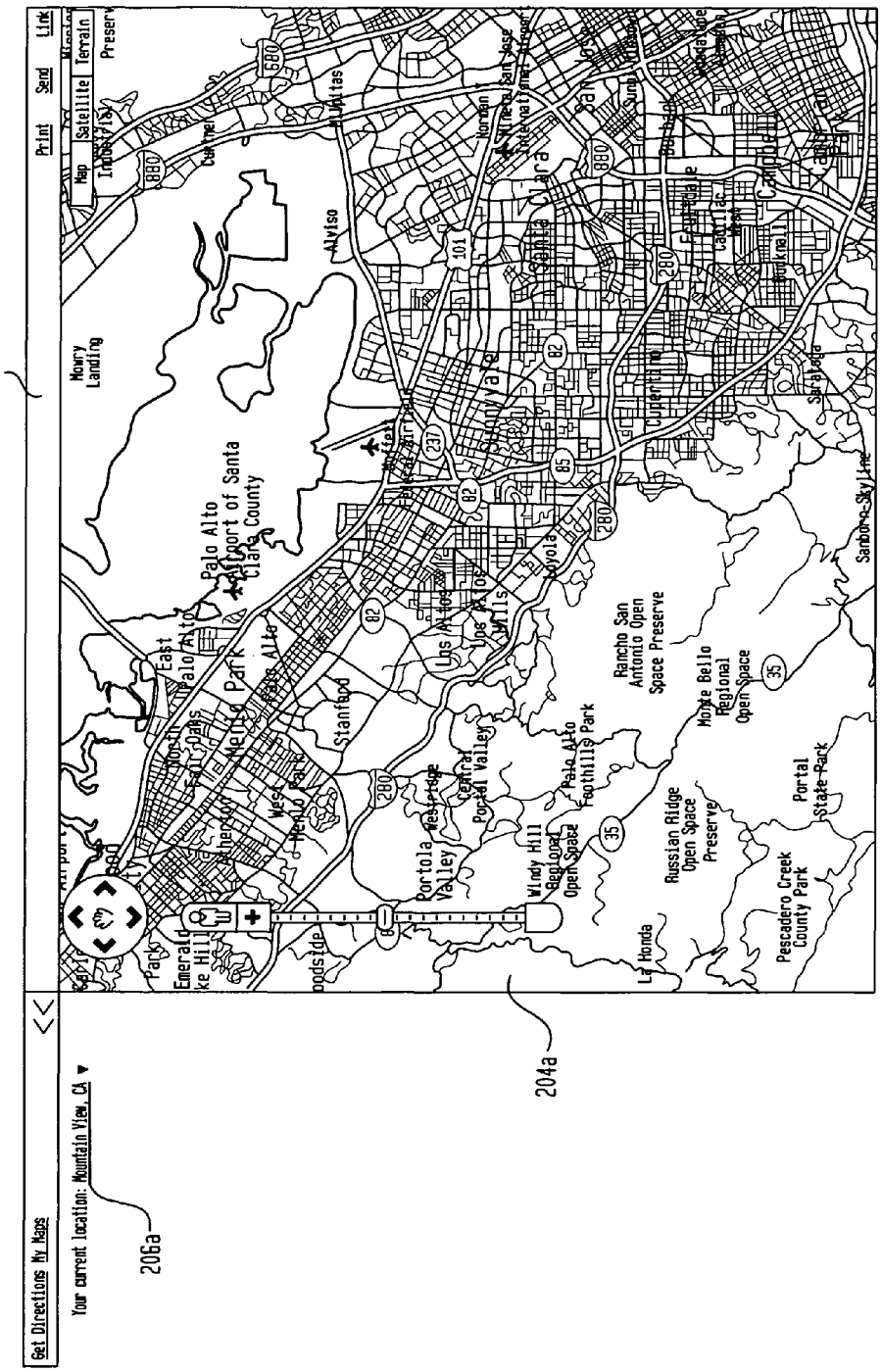
Figure 2B:
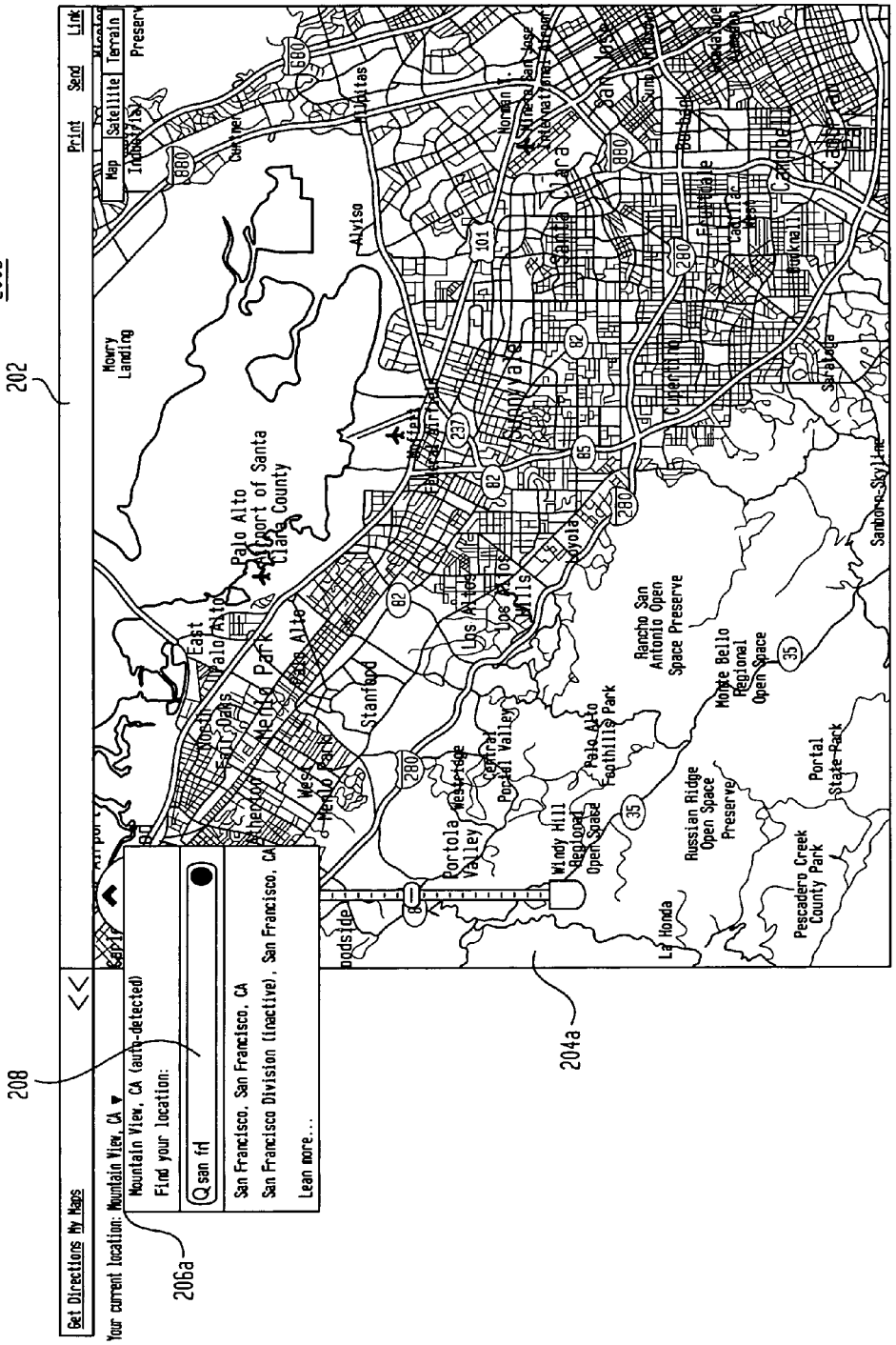
Figure 2C:
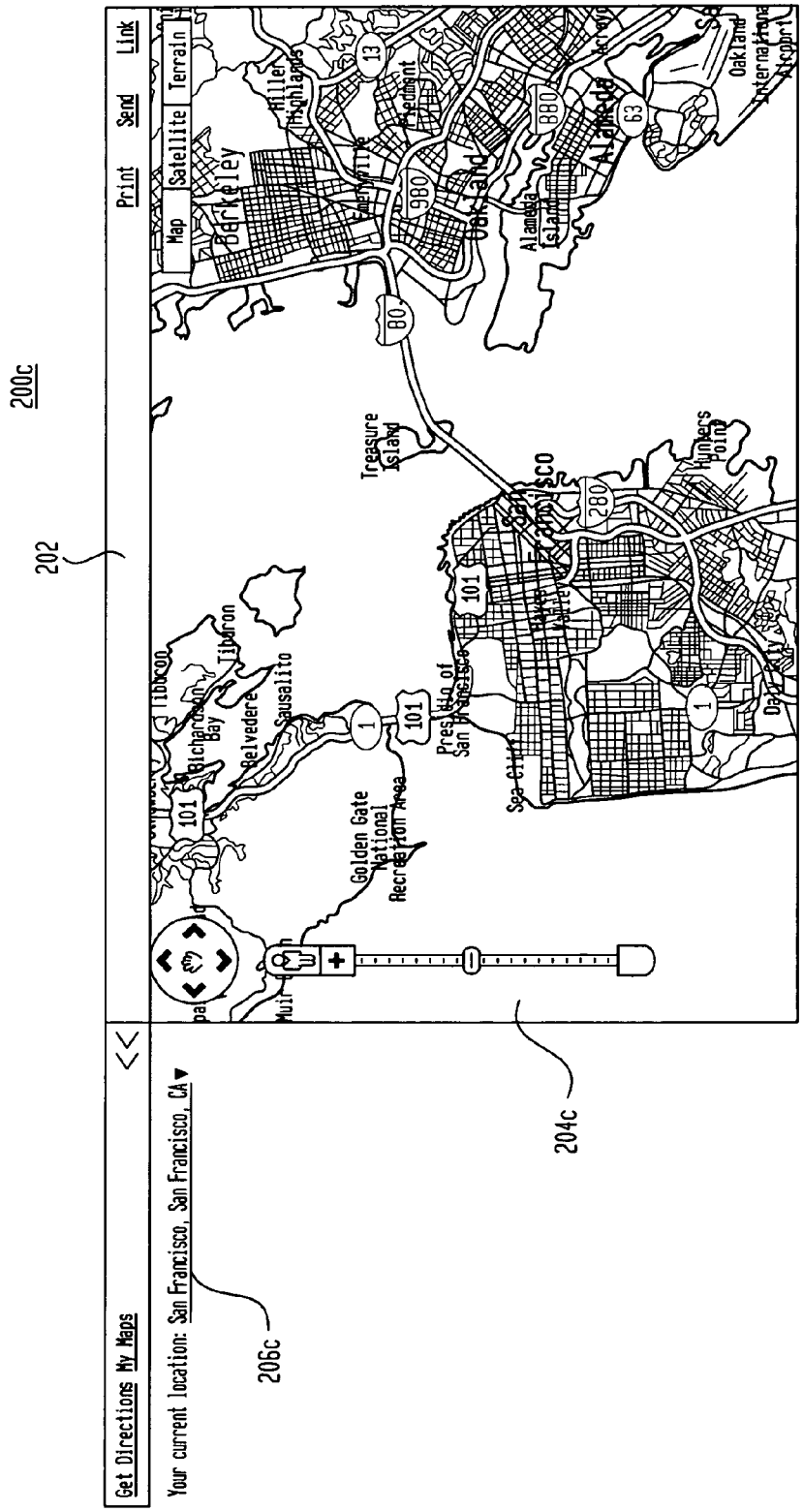

FIGS. 2a, 2b, and 2c are illustrations of a user interface for location correction according to an embodiment. FIG. 2a illustrates a first screen shot 200a of a software application that may utilize location-based services. As shown in first screen shot 200a, the location-based application may be a map application 202 displaying a map 204a. In an embodiment, map application 202 may be a map gadget. In another embodiment, map application 202 may be a map applet.

When map application 202 is executed, a location request may be generated to determine the user's current location. The user's current location 206a may be used as the initial position of map 204a. As shown in FIG. 2a, for example, the user's current location 206a is Mountain View, Calif., and map 204a is centered on Mountain View, Calif. It may be advantageous for the initial position of the map 204a to be at or as close to a user's actual current location as possible. By using a user's current address, location-based services, such as directions, advertising, recommendations, and social networking may be more accurate and effective. However, it may be rare or difficult for a map gadget to know a user's actual location. Thus, it may be necessary to predict the user's current location.

In an embodiment, a user's current location may be predicted based at least in part on information associated with a location request. When a user loads or executes map application 202, various information may be associated with the map application 202, the user, and/or the user's network device. Such information may be communicated with a location request. Information associated with a location request may include, for example and without limitation, an Internet Protocol address, a Media Access Control address, a global positioning system coordinate, a network name, a provider name, an organization type, a cellular tower identifier, or a user provided location.

In an example, a user's current location may be predicted based at least in part on the user's IP address. A database, such as a commercially available IP geolocation database, may be used to match an IP address associated with the location request with a location. In another example, the user's current location may be predicted based at least in part on a network name. In the example, a network name may be "Company HQ wireless network." The address of Company HQ may then be used to predict the current location. In other embodiments, other combinations of information associated with a location request may be used to predict the user's current location.

FIG. 2b illustrates a second screen shot 200b of map application 202. As shown in FIG. 2b, current location 206a of map 204a may be changed via a location correction 208. Location correction 208 may be a new or corrected location. The location correction 208 may be generated in response to an automatically generated location, or possibly in response to a null location (e.g. a user's current location was never predicted, and no location-based services were offered).

In an example, map 204a may be displayed in a map application 202. Map 204a may be initially positioned at some generic point, such as the center of a city or country. A user may generate location correction 208 by specifying a new location for re-positioning the map. When the user specifies the corrected location, location correction 208 may be communicated from location-based application 202 to a location corrector, where the corrected location may be stored in a location storage.

A user may want to change their current location because the predicted location is incorrect. For example, a user's predicted location may be in one city, whereas the user's actual location is in a neighboring city. In one alternative, a user may want to change their current location because the predicted location is imprecise. For example, a user predicted location may be the correct city, but a user may wish to input a more precise address in the city as their current address.

Location correction 208 may be a manual location correction based at least in part on manual input. In an embodiment, a manual location correction may be based on a graphical interaction with a location-based application. For example, the user may drag a pointer, such as a "current location" pointer, to a different location on map 204a. In other embodiments, a manual location correction may be based on other forms of user input, such as typing in an address in location correction input field, or speaking a location name (e.g. business name, school, transit stop, park, etc.) to be recognized through voice recognition.

As an alternative, location correction 208 may be an automatic location correction. In an embodiment, a location-based application may include preferences, or rules, for determining whether to automatically correct a map location. In an embodiment, when a predicted location is in a certain zip code, location-based application 202 may automatically correct the location to a specific address. For example, a zip code may be sparsely populated, but include a significant feature, such as a university or landmark. The location-based application 202 may automatically correct the location to the address of the university or the landmark rather than the geographic center of the zip code.

When location correction 208 is generated, location correction 208 may be communicated to a location storage, where the corrected location is stored therein. Additionally, a routing identifier associated with the location correction may be identified, and stored with the location. By saving location corrections, such information may be used to more accurately predict a user's location during subsequent location requests. Location corrections may be intelligently considered by location corrector 302 on future uses of map application 202.

FIG. 2c illustrates a third screen shot 200c of map application 202 displaying map 204c. Map 204c may be centered on a new current location 206c, e.g. San Francisco, Calif. As shown in FIG. 2c, current location 206c may be different than initial current location 206a. In an embodiment, current location 206c may be a manual location correction specified by a user, such as illustrated in FIG. 2b.

Although FIGS. 2a, 2b, and 2c illustrate a map application 202 utilizing location-based services, in other embodiments other applications may also utilize location-based services, and thus take advantage of location corrections. Examples of other location-based software applications include, without limitation, astronomy applications, augmented reality applications, search applications, shopping applications, and social media applications.

Illustrated Systems for Location Correction

Figure 3:
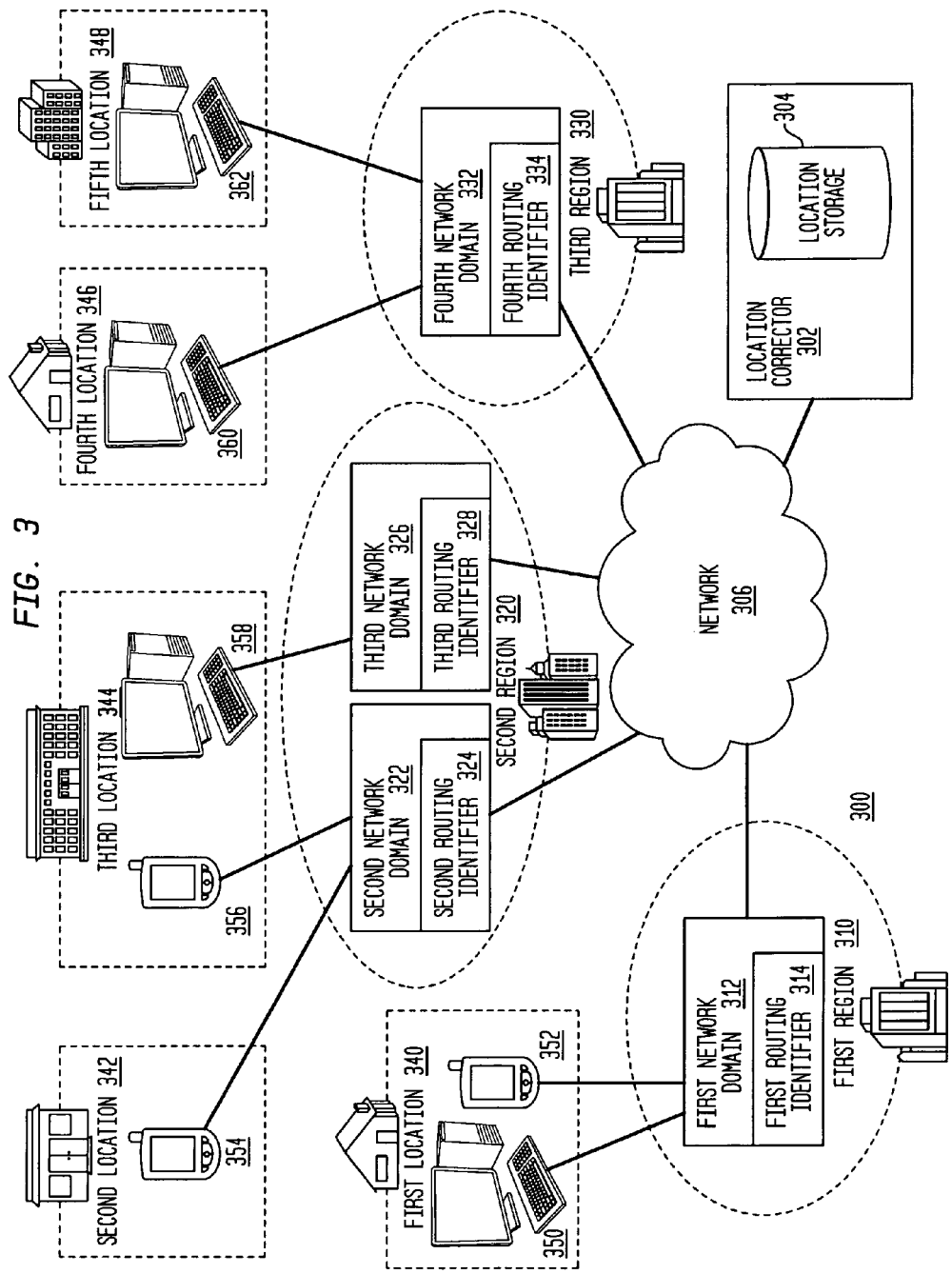
FIG. 3 is a block diagram of a system for location correction according to an embodiment.

FIG. 3 is a block diagram of a system 300 for location correction according to an embodiment. The system 300 may include a location corrector 302, a network 306, a first network domain 312, a second network domain 322, a third network domain 326, and a fourth network domain 332. Location corrector 302, first network domain 312, second network domain 322, third network domain 326, and fourth network domain 132 may all be interconnected through network 306. In an embodiment, network 306 may be the Internet.

Location corrector 302 may receive a location associated with a location correction, and identify a routing identifier associated with the location correction. In an embodiment, location corrector 302 may include location storage 304. Location storage may store the location and routing identifier associated with the location correction. Location corrector 302 may also receive a location request, and identify a routing identifier associated with the location request.

Network domains 312, 322, 326, 332 may provide end users with access to network 306. Examples of network domains include, such as and without limitation, Internet Service Providers (ISPs), college campus networks, government networks, or corporate networks. In an example, network 306 may be the Internet, and network domain 312 may be an ISP. Network devices, such as a computer 350, or a smart phone 352, may connect to network 306 through first network domain 312. Smart phone 356 may connect to the Internet 106 through second network domain 322, and computer 358 may connect to the Internet 306 through third network domain 326.

In an embodiment, each network domain 312, 322, 326, and 332 may be an autonomous system. In a further embodiment, each network domain 312, 322, 326, and 332 may manage their respective connections to network 306 via a single policy. For example, each connection to network 306 through first network domain 312 may be subject to the same geographical IP allocation policy. A geographical IP allocation policy may specify, for example, that different ranges of IP address are assigned to different local areas. A first group of IP addresses, such as 205.129.12.1 to 205.129.12.62 may be assigned to Washington D.C. A second group of IP addresses, such as 205.129.12.64 to 205.129.12.126 may be assigned to Northern Virginia. And a third group of IP addresses, such as 205.129.12.128 to 205.129.190 may be assigned to Maryland.

Each network domain 312, 322, 324, 342 may be located in a single region. A region may be, for example and without limitation, a zip code, neighborhood, city, metropolitan area, area code, state, province, or multi-state area. In an alternative, some or all of network domains 312, 322, 324, 342 may be located in multiple regions. In an embodiment, first network domain may be located in a first region 310, second network domain 322 and third network domain 326 may be located in a second region 320, and fourth network domain 332 may be located in a third region 330. In another embodiment, first network domain 312 may span first region 310 and second region 320.

Each network domain 312, 322, 324, 342 may be associated with a routing identifier 314, 324, 328, and 344, respectively. In an embodiment, first network domain 312 may be associated with a first routing identifier 314, second network domain 322 may be associated with a second routing identifier 324, third network domain 326 may be associated with a third routing identifier 328, and fourth network domain 332 may be associated with a fourth routing identifier 334. A routing identifier may be a unique identifier assigned to each different network domain. Routing identifiers may be used for inter-domain communication between individual network domains.

In an embodiment, each network domain 312, 322, 326, 332 may be an autonomous system, and each routing identifier 314, 324, 328, 334 may be an autonomous system number (ASN). An ASN may be assigned to each network domain for use in inter-domain routing, and may uniquely identify an individual domain. In an example, BGP may utilize ASNs for routing between network domains.

An ASN may be a 16 bit integer, as potentially specified in RFC 1771 ("A Border Gateway Protocol 4"). In an alternative, an ASN may be a 32 bit integer, as potentially specified in RFC 1930 ("Guidelines for creation, selection, and registration of an Autonomous System"). In still other alternatives, an ASN may be a number or alphanumeric identifier of some other size. An ASN may be assigned by a regional authority, such as a Regional Internet Registry.

In an embodiment, location predictions may be tied to ASNs. By tying location predictions to ASNs, distinct corrections may be applied intelligently when a user loads a map application 202 on different network domains, such as at home, work, an airport, and a coffee shop. Furthermore, by using ASNs for location predictions, specifics of each network, such as the provider name, organization type, etc., may not be necessary for effective location predictions and/or corrections.

In another embodiment, each routing identifier may be a routing domain identifier (RDI). The Inter-Domain Routing Protocol (IDRP) may utilize RDIs for routing between network domains. Each network domain that uses IDRP may be assigned a RDI.

System 300 may also include network devices 350, 352, 354, 356, 358, 360, and 362. Network devices may include, for example and without limitation, general purpose computers, mobile smart phones, network enabled televisions, network enabled electronic picture frames, portable media players, and gps devices. In an embodiment, network devices 350, 358, 360, and 362 may be computers, and network devices 352, 354, 356 may be smart phones. Some network devices, such as computers 350, 358, 360, 362, may remain fixed, and operated at one location in one region. Other network devices, such as smart phones 352, 354, 356, may be mobile, and operated across multiple locations in the same or different regions.

Each network device 350, 352, 354, 356, 358, 360, 362 may connect to network 306 through one or more network domains 312, 322, 326, 332. In an embodiment, network device 350 and smart phone 352 may connect to network 306 via first network domain 312. In another embodiment, smart phone 352 may connect to network 306 via second network domain 322, third network domain 326, or fourth network domain 132.

As shown in FIG. 3, both network device 350 and network device 352 may be located in first region 310 at a first location 340, depicted as a first residence. Other network devices may be located at the same first location 340, at a different location in first region 310 (not shown in FIG. 3), or in a different region (e.g. second region 320, third region 330). In an embodiment, network device 354 may be located in a second region 320 at second location 342, depicted as a shop. Network devices 356, 358 may be located in second region 320 at a third location 344, depicted as a university. Network device 360 may be located in a third region 330 at a fourth location 346, depicted as a second residence. And network device 362 may be located in third region 330 at a fifth location 348, depicted as a commercial office.

In an embodiment, one network domain may provide connections to network 306 to multiple network devices located across multiple locations. For example, network device 354 may be located at second residence 342 while network device 356 may be located at university 344. Nonetheless, network devices 354, 356 may still connect to network 306 via second network domain 322.

Each network device may connect to network 306 through one or more network domains. In an illustrated embodiment, network devices 350, 352 may connect to network 306 through first network domain 312, network devices 354, 356 may connect to network 306 through second network domain 322, network device 358 may connect to network 306 through third network domain 326, and network devices 360, 362 may connect to network 306 through fourth network domain 342. A mobile network device such as a smart phone or a mobile computing pad may be operated across different local areas and across different regions. For example, an Android Tablet may connect to the Internet via an ISP at a residence, connect to the Internet via a second ISP at a workplace, and connect to the Internet via a third ISP at an airport.

Network devices 350, 352, 354, 356, 358, 360, 362 may execute one or more location-based applications. In an embodiment, network device 350 executes map application 202. When map application 202 is started by a user on network device 350, map application 202 may generate a location request, e.g., a request for the user's current location. The location request may be communicated from network device 350 via first network domain 312 and network 306 to location corrector 302.

In an embodiment, location-based applications executing on network devices 350, 352, 354, 356, 358, 360, 362 may generate one or more location corrections. When a location correction is generated, the location correction may be communicated from map application 202, for example executing on network device 350, via first network domain 312 and network 306 to location corrector 302. Location storage 304 may store one or more locations (e.g. one or more corrected locations). Additionally, location storage 304 may also store a routing identifier and/or a region associated with one or more location corrections.

Figure 4:
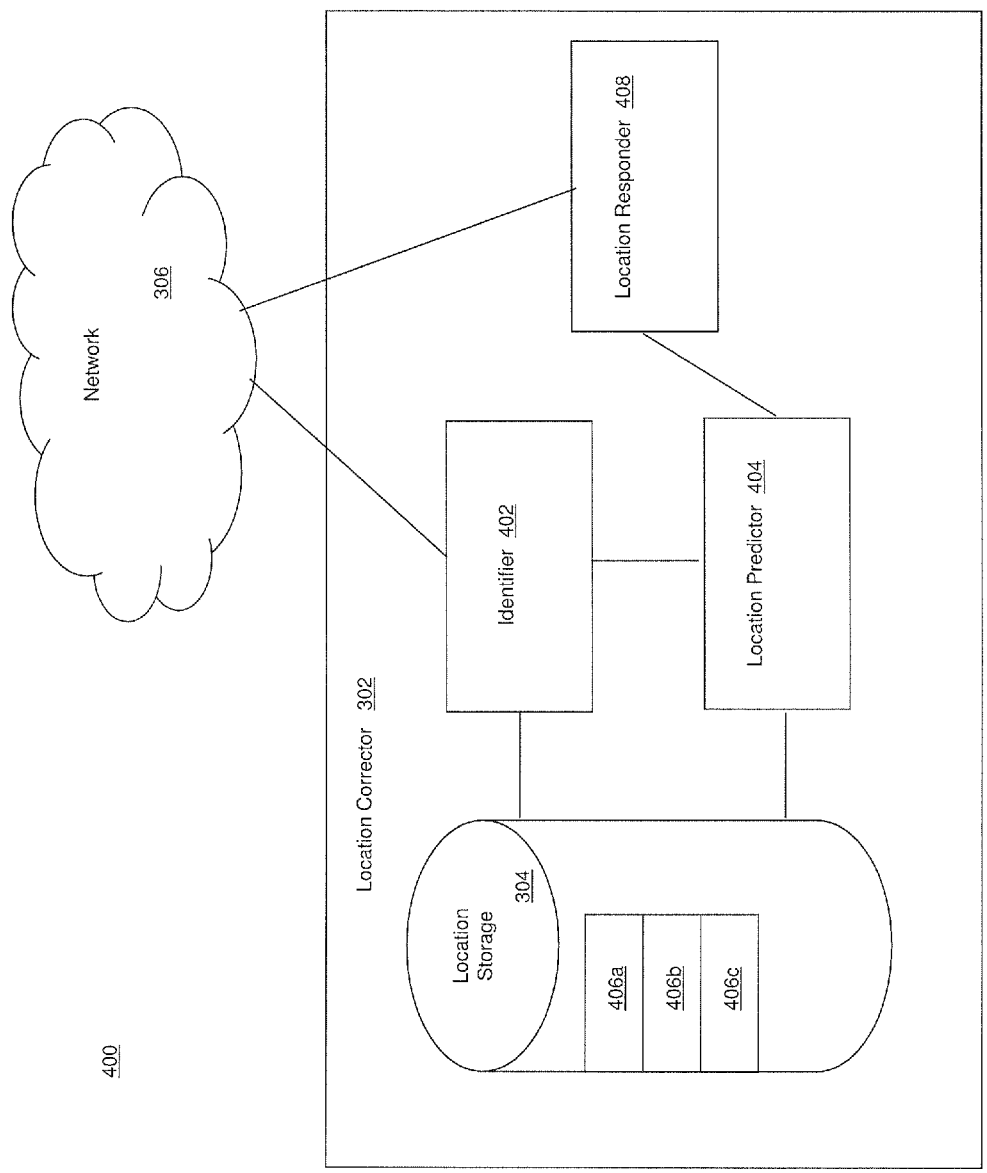
FIG. 4 is a block diagram of a system for location correction according to an embodiment.

FIG. 4 is a block diagram of a system 400 for location correction according to an embodiment. System 400 may include location corrector 302 and network 306. Location corrector 302 may include location storage 304, identifier 402, location predictor 404, and location responder 408.

In an embodiment, location corrector 302 may receive a location correction over network 306. Location corrections may include a location associated with the location correction (e.g. a corrected location). Such locations may be, for example, a coordinate, or set of coordinates. In an embodiment, a location may include a latitude, a longitude, and an altitude.

After a location correction is received, identifier 402 may identify a routing identifier associated with the location correction. A location correction may be generated by a location-based application executing on a network device (e.g. network devices 350, 352, 354, 356, 358, 360, 362). Location corrections may be communicated from the location-based application and routed through a network domain (e.g. network domains 312, 322, 326, 332). When a location correction is routed through a network domain, a routing identifier of the network domain may become associated with the location correction. Then, when location corrector 302 receives a location correction, identifier 402 may identify a routing number associated with the location correction. Once a routing identifier of a location correction has been identified, location storage 304 may store the location and routing identifier.

Identifier 402 may also identify a region associated with a location. In an embodiment, a corrected location associated with a location correction is received by location corrector 302. Identifier 402 may identify a routing identifier associated with the location correction, and a region associated with the corrected location. A region of a location may be identified directly, by determining the region that includes the location. As an alternative, a region of a location may be identified indirectly. As an example, identifier 402 may predict a region based on information associated with a location correction and/or location request, such as an IP address.

In an embodiment, location storage 304 may store a first location 406a, a second location 406b, and a third location 406c. Furthermore, location storage 304 may store a routing identifier associated with each location 406a, 406b, 406c. Each location 406a, 406b, 406c may be associated with a location correction.

In addition to receiving a location correction, location corrector 302 may also receive a location request from network 306. A location request may include a request from map application 202 to identify a current location of the user. Like location corrections, location requests may be communicated from an originating device (e.g. network devices 350, 352, 354, 356, 358, 360, 362) and routed through a network domain (e.g. network domains 312, 322, 326, 332). When a location request is communicated through a network domain 312, 322, 326, 332, a corresponding routing identifier of the network domain may become associated with the location request. Then, when location corrector 302 receives a location request, location corrector 302 may identify a routing number associated with the location request.

Location predictor 404 may predict a current location based at least in part on a comparison of a routing identifier associated with the location request and a routing identifier associated with a location correction. Location predictor 404 may compare a routing identifier of the location request with one or more routing identifiers stored in location storage 304. In an embodiment, one or more locations 406a, 406b, and/or 406c may be stored in location storage 304. Each location stored in location storage 304 may be associated with a routing identifier, also stored in location storage 304. Location predictor 404 may compare the routing identifier of a location request with each routing identifier stored in location storage 304.

A user's location may be predicted according to several scenarios. In a first scenario, location storage 304 may be empty (e.g. location storage 304 may store zero locations). Consequently, location predictor 404 may predict a current location of the user based at least in part on information associated with the location request. Location storage 304 may be empty, for example, because a user may not have previously submitted any location corrections. As one alternative, location storage 304 may have been cleared based on a user's privacy preferences. As another alternative, location storage 304 may have been manually or automatically cleared because one or more stored locations expired. It may be advantageous to associate an expiration date with a location associated with a correction because ASNs may not provide a permanent mapping to a single network. For example, an ISP associated with a first ASN may be purchased by an ISP associated with a second ASN. As another example, a business operating an autonomous network with an associated ASN may go out of business, and the associated IP numbers may be reallocated to an autonomous system in a different region.

In a second scenario, one or more locations may be stored in location storage 304. When map 204a is loaded, a location request may be generated. Location corrector 302 may receive the location request and identify a first routing identifier associated with the location request. Next, the first routing identifier of the location request may be compared with one or more routing identifiers stored in location storage 304. Location storage 304 may store an associated routing identifier for each stored location.

In an embodiment, when location storage 304 stores at least one location and an associated routing identifier, a comparison between a routing identifier associated with a location request and the at least one stored routing identifier may have two outcomes. In a first case, the routing identifier of the location request may match one or more stored routing identifiers. Consequently, location predictor 404 may calculate the current location based at least in part on one of the stored locations associated with the matching routing identifier(s). Matching routing identifiers may indicate that the location request traveled through the same network domain as a location correction. In such a case, basing the calculation of the current location on the location correction may lead to a more accurate determination of the user's current location.

If a routing identifier of a location request matches a single routing identifier stored in location storage 304, then the stored location associated with the matching routing identifier may be used to predict the user's current location. If a routing identifier of a location request matches multiple routing identifiers stored in location storage 304, then at least one of the associated stored locations may be used to predict the user's current location. In an example, a location associated with the matching routing identifier which was most recently stored may be used to predict the user's current location. In another example, a popular or common location associated with a matching routing identifier may be used to predict the user's current location.

In a second case, the routing identifier of the location request may not match one or more stored routing identifiers. In this second case, location predictor 404 may calculate the current location based at least in part on information associated with the location request. In this second case, previous location corrections may provide no additional accuracy for predicting the current location since each location correction is more likely to have originated from a different location or even a different region.

As shown in FIG. 4, location corrector 302 may also include location responder 408. Location responder 408 may respond to a location request with a predicted location. The predicted location may be communicated from location corrector 302 via network 306 and to a network device through a network domain.

In an embodiment, location corrector 402 may receive a location correction and subsequently a location request. Identifier 402 may identify a first routing identifier of a first location associated with the location correction, and identify a second routing identifier associated with the location request. Location predictor 404 may then predict a second location based at least in part on a comparison of the first routing identifier and the second routing identifier. Finally, location responder 408 may respond to the location request with the second location.

Illustrated Methods for Location Correction

Figure 5:
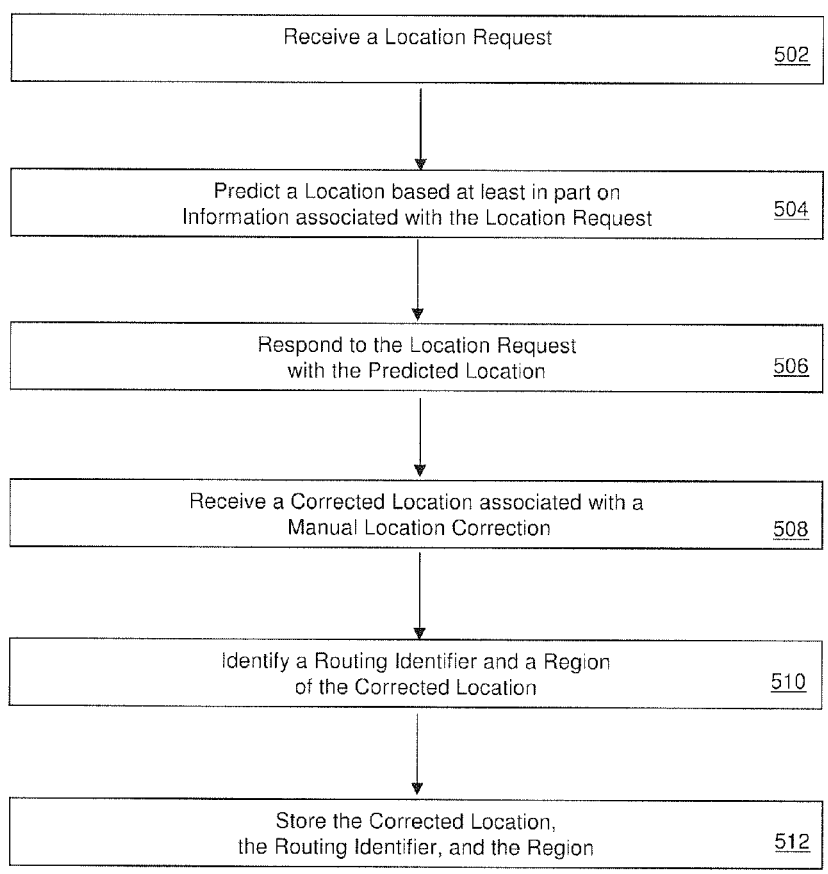
FIG. 5 is a flow diagram of a method for location correction according to an embodiment.

FIG. 5 is a flow diagram of a method 500 for location correction according to an embodiment. Method 500 begins at stage 502, where a location request may be received. The location request may be generated by a location-based software application, such as map application 202, when map application 202 starts. The location request may be a request for the current location of a user, and initialize map 204a at the predicted current location. The location request may be communicated via a network domain and network 306 and received by location corrector 302.

At stage 504, a location may be predicted based at least in part on information associated with the location request. In an embodiment, location predictor 404 may predict the location. The location request may be associated with various information such as, for example and without limitation, an Internet Protocol address, a Media Access Control address, a global positioning system coordinate, a network name, a provider name, or an organization type.

In an embodiment, a location may be predicted based on the IP address of the network device (e.g. IP Geolocated). In the embodiment, an IP address geolocation database may be used to predict the location. In another embodiment, a location may be predicted based at least in part on the provider name. A database of providers and corresponding geographical areas or locations may be used to predict the location. In still other embodiments, other combinations of information may be used to predict the location.

At stage 506, the location request may be responded to with the predicted location. In an embodiment, location responder 408 may communicate the predicted location to map application 202 over network 306. The predicted location may then be used by map application 202 to set an initial position of map 204a.

At stage 508, a corrected location associated with a manual location correction may be received. In an embodiment, the corrected location may be received over network 306 by location corrector 302. The corrected location may result from a location correction of a predicted location. In an example, after map 204a loads at a first predicted location, a user generates a manual location correction by specifying a different current location (e.g. a corrected location). Map application 202 may then communicate the manual location correction via a network domain and network 306 to location corrector 302.

At stage 510, a routing identifier and a region of the corrected location may be identified. When a corrected location is communicated from a network device through a network domain, a routing identifier of the network domain may become associated with the corrected location. During or after reception of a location correction, location corrector 302 may identify the routing identifier of the location correction.

The region of a corrected location may also be identified. In an embodiment, identifier 402 may identify the region. The region may be postal code, city, metropolitan area, area code, state, or province. The region may be identified based at least in part on the corrected location. For example, when a corrected location is a city, a region associated with the corrected location may be identified as the metropolitan area including the city. As another example, when a corrected location is an address, a region associated with the corrected location may be identified as the zip code including the address.

At stage 512, the corrected location, the routing identifier, and the region may be stored. In an embodiment, location storage 304 stores the corrected location, the routing identifier, and the region. Locations stored in the location storage 304 may be used for later prediction of locations.

Figure 6:
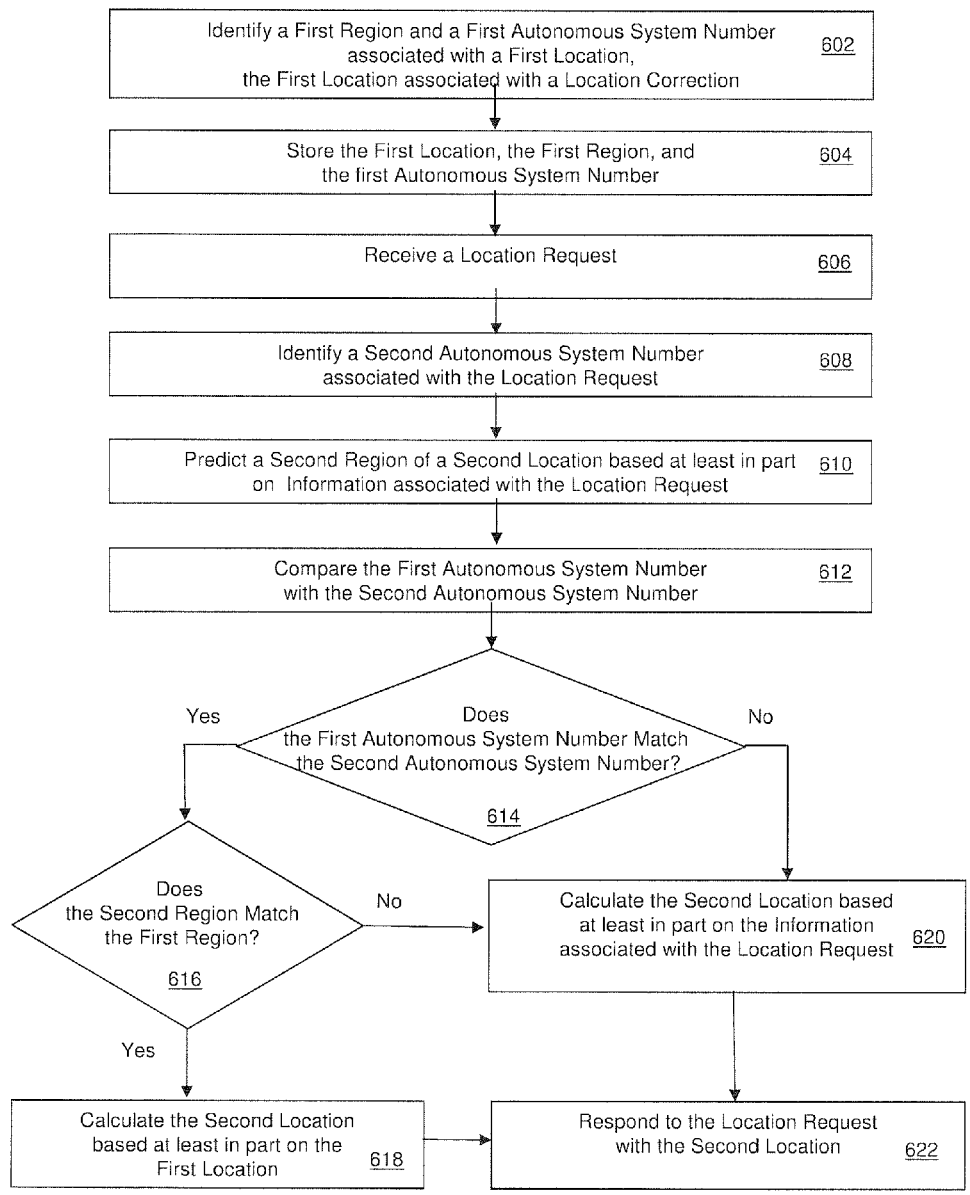
FIG. 6 is a flow diagram of a method for location correction according to an embodiment.

FIG. 6 is a flow diagram of a method 600 for location correction according to an embodiment. Method 600 begins at stage 602, where a first region and a first autonomous system number associated with a first location may be identified. In an embodiment, identifier 402 identifies the first region and first autonomous system number. The first location may be associated with a location correction.

As an example, a user may load map application 202 on network device 352. After map 204a is initialized at an initial location, a user may correct the initial location, or generate a location correction. The location correction may then be communicated from the network device 352 through first network domain 312 and network 306. Location corrector 302 may receive the location corrector, and identifier 302 may identify a region of the corrected location and an autonomous system number associated with the location correction.

At stage 604, the first location, the first region, and the first autonomous system number are stored. In an embodiment, location storage 304 stores the first location, the first region, and the first autonomous system number.

At stage 606, a location request may be received. In an embodiment, location corrector 302 may receive location requests through network 306. Location requests may be generated by map application 202 executing on a network device 350, 352, 354, 356, 358, 360, 362.

At stage 608, a second autonomous system number associated with the location request may be identified. In an embodiment, identifier 402 identifies the second autonomous system number. A location request may be communicated via the same autonomous system as the first location associated with the location correction. In such a scenario, the second autonomous system number for the location request may be the same as the first autonomous system number for the location correction. In another embodiment, a location request may be communicated from a different autonomous system then the first location associated with the location request. Therefore, the second autonomous system number of the location request will be different than the first autonomous system number of the location associated with the location request.

At stage 610, a second region of a second location may be predicted based at least in part on information associated with the location request. In an embodiment, location predictor 404 may predict the second region of the second location. As an example, the IP address of a network device generating the location request may be used to predict the region of the second request. In another example, an organization name associated with the network device generating the location request may be used to predict the region of the second request.

In an embodiment, location predictor 404 may predict a location based at least in part on a comparison of a first routing identifier and a second routing identifier. At stage 612, the first routing identifier may be compared with the second routing identifier. The first routing identifier may be associated with a location correction, and the second routing identifier may be associated with a location request.

At stage 614, it may be determined whether the first autonomous system number matches the second autonomous system number. A match between the first ASN and the second ASN may indicate that a location correction and a location request were generated from a network device(s) communicating through the same network domain. Because each ASN may be uniquely assigned to an individual autonomous system, the determination at stage 614 may be a determination of an exact match.

If the first autonomous system number matches the second autonomous system number, then it may be determined whether the second region (e.g. the predicted region of the second location) matches the first region (e.g. the corrected region) at stage 616. In an embodiment, a network domain may span multiple regions. By using a predicted region, location predictor 404 may be able to differentiate between corrected locations from the same region versus corrected locations from a different region. A match between a predicted region and a corrected region may provide an additional layer of accuracy to location corrections.

If the predicted region matches the corrected region, then the second location may be calculated based at least in part on the first location at stage 618. By basing the prediction on a matched comparison of autonomous system numbers and a matched comparison of regions, corrections may be applied intelligently where an autonomous system spans multiple regions.

If the first autonomous system number does not match the second autonomous system number, then the second location may be calculated based at least in part on information associated with the location request at stage 620. The situation where there is no match between one or more stored autonomous system numbers and an autonomous system number associated with a location request may indicate that the user's current location does not correspond to a previous corrected location.

The second location may also be calculated based at least in part on information associated with the location request at stage 620 if the second region does not match the first region. In an embodiment, one or more location corrections may have been received from a single region. Such location corrections, however, may be ineffective for predicting a location in a different region.

After the second location has been predicted at either stage 618 or stage 620, then the location request may be responded to with the second location 622. In an embodiment, location responder 408 may respond to the location request with the second location (e.g. a predicted location). The second location may be communicated from location corrector 302 across network 106 to map application 202 on a network device.

Example Computer Embodiment

Figure 7:
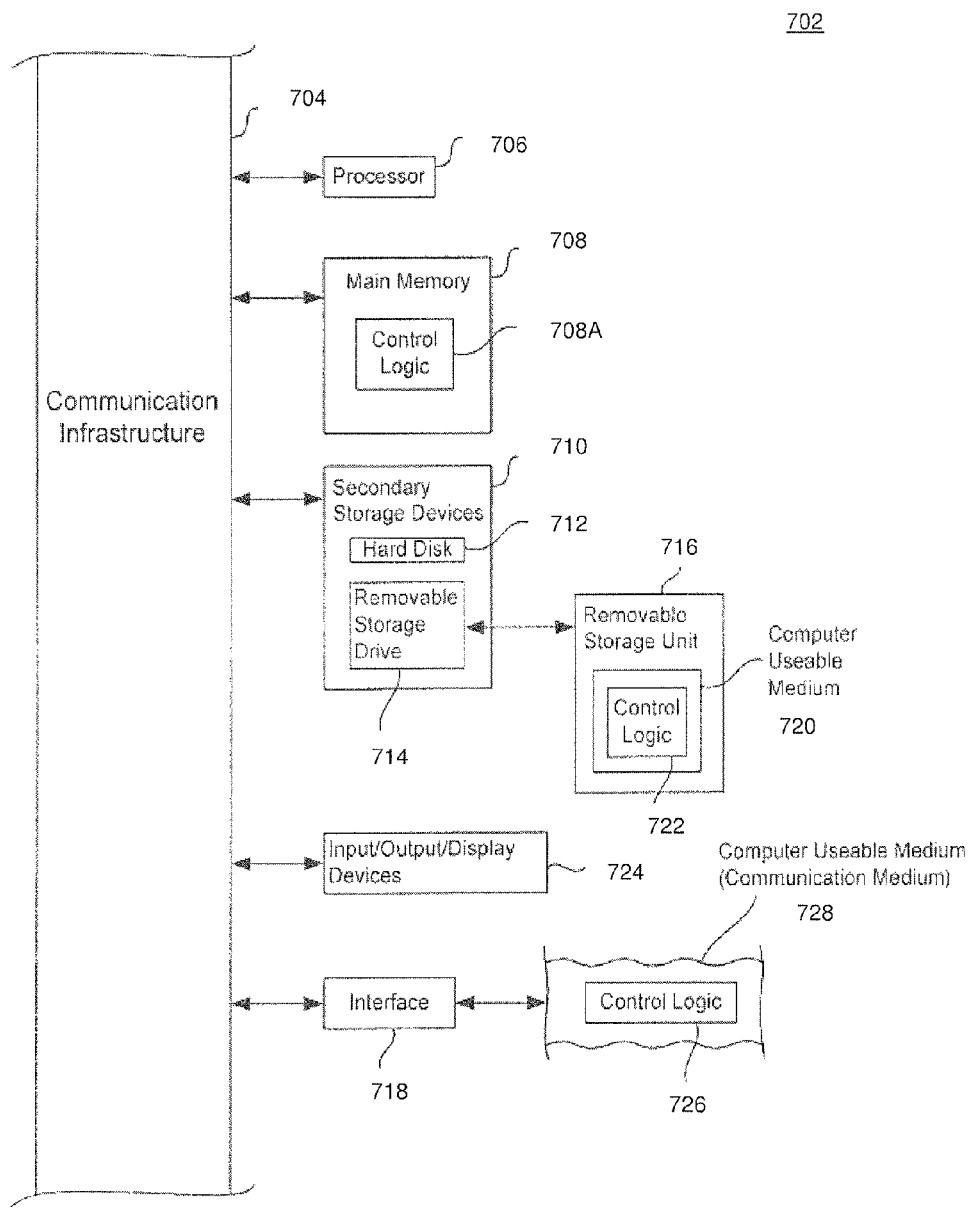
FIG. 7 is a block diagram of a system for location correction according to an embodiment.

In an embodiment, the system and components of embodiments described herein are implemented using well known computers, such as example computer 702 shown in FIG. 7. For example, location corrector 302, location storage 304, and network devices 350, 352, 354, 356, 358, 360, 362 may be implemented using computer(s) 702.

Computer 702 can be any commercially available and well known computer capable of performing the functions described herein, such as computers available from International Business Machines, Apple, Sun, HP, Dell, Compaq, Cray, etc. Computer 702 can also be any commercially available and well known tablet, mobile device or smart-phone capable of performing the functions described herein, such as devices available from Apple, HTC, RIM, Nokia, Sony, etc.

Computer 702 may include one or more processors (also called central processing units, or CPUs), such as a processor 706. Processor 706 may be connected to a communication infrastructure 704.

Computer 702 may also include a main or primary memory 708, such as random access memory (RAM). Primary memory 708 may have stored therein control logic 708A (computer software), and data.

Computer 702 may also include one or more secondary storage devices 710. Secondary storage devices 710 may include, for example, a hard disk drive 712 and/or a removable storage device or drive 714, as well as other types of storage devices, such as memory cards and memory sticks. Removable storage drive 714 represents a floppy disk drive, a magnetic tape drive, a compact disk drive, an optical storage device, tape backup, etc.

Removable storage drive 714 may interact with a removable storage unit 716. Removable storage unit 716 may include a computer useable or readable storage medium 720 having stored therein computer software 722 (control logic) and/or data. Removable storage unit 716 may represent a floppy disk, magnetic tape, compact disk, DVD, optical storage disk, or any other computer data storage device. Removable storage drive 714 may read from and/or write to removable storage unit 716 in a well known manner.

Computer 702 may also include input/output/display devices 724, such as monitors, keyboards, pointing devices, Bluetooth devices, etc.

Computer 702 may further include a communication or network interface 718. Network interface 718 may enable computer 702 to communicate with remote devices. For example, network interface 718 may allow computer 702 to communicate over communication networks or mediums 728 (representing a form of a computer useable or readable medium), such as LANs, WANs, the Internet, etc. Network interface 718 may interface with remote sites or networks via wired or wireless connections.

Control logic 726 may be communicated to and from computer 702 via communication medium 728.

Any tangible apparatus or article of manufacture comprising a computer useable or readable medium having control logic (software) stored therein is referred to herein as a computer program product or program storage device. This may include, but is not limited to, computer 702, main memory 708, secondary storage devices 710. Such computer program products, having control logic stored therein that, when executed by one or more data processing devices, cause such data processing devices to operate as described herein, represent the embodiments.

Embodiments can work with software, hardware, and/or operating system implementations other than those described herein. Any software, hardware, and operating system implementations suitable for performing the functions described herein can be used. Embodiments may be applicable to both a client and to a server or a combination of both.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for correcting a predicted location, comprising:
    identifying a first region and a first routing identifier of a first location associated with a location correction for a user;
    storing the first location, the first routing identifier, and the first region;
    receiving a location request for a current location of the user from a map application;
    identifying a second routing identifier associated with the location request;
    calculating a second region associated with the location request based at least in part on information associated with the location request;
    predicting a second location based at least in part on a comparison of the first routing identifier and the second routing identifier; and
    responding to the location request with the second location, wherein predicting the second location comprises:
        comparing the first routing identifier to the second routing identifier;
        comparing the first region to the second region;
        calculating the second location based on the first location when the first routing identifier matches the second routing identifier and the first region matches the second region; and
        calculating the second location based on information associated with the location request when the first routing identifier does not match the second routing identifier or the first region does not match the second region; and
        automatically correcting the second location based on the region comparison and the routing identifier comparison to provide additional accuracy to the location correction.

2. The method of claim 1, wherein the information associated with the location request comprises at least one of an Internet Protocol address, a Media Access Control address, a global positioning system coordinate, a network name, a provider name, an organization type, a cellular tower identifier, or a user provided location.

3. The method of claim 1, wherein the location correction comprises a manual location correction based at least in part on manual input.

4. The method of claim 1, wherein the manual input comprises a map position, address, location name, or coordinate.

5. The method of claim 1, wherein the first location comprises a first geographical coordinate and the second location comprises a second geographical coordinate.

6. The method of claim 5, wherein the first geographical coordinate comprises a first latitude, a first longitude, and a first altitude, and the second geographical coordinate comprises a second latitude, a second longitude, and a second altitude.

7. The method of claim 1, wherein the first routing identifier comprises a first autonomous system number and the second routing identifier comprises a second autonomous system number.

8. The method of claim 1, wherein the location request comprises a widget request.

9. The method of claim 1, wherein the first region and the second region comprise a postal code, city, metropolitan area, area code, state, or province.

10. A system for correcting a predicted location, comprising:
    one or more processors; and
    a non-transitory computer-readable memory coupled to the one or more processors and storing thereon a plurality of modules executed on the one or more processors, the plurality of modules including:
        an identifier that identifies a first region and a first routing identifier of a first location associated with a location correction for a user and identifies a second routing identifier of a location request for a current location of the user;
        a location storage that stores the first location, the first region, and the first routing identifier associated with the first location;
        a region determinator that calculates a second region associated with the location request based at least in part on information associated with the location request;
        a location predictor that predicts a second location based at least in part on a comparison of the first routing identifier and the second routing identifier; and
        a location responder that responds to the location request with the second location,
            wherein the location predictor is configured to:
                compare the first routing identifier to the second routing identifier;
                compare the first region to the second region;
                calculate the second location based on the first location when the first routing identifier matches the second routing identifier and the first region matches the second region; and
                calculate the second location based on information associated with the location request when the first routing identifier does not match the second routing identifier or the first region does not match the second region; and automatically correct the second location based on the region comparison and the routing identifier comparison to provide additional accuracy to the location correction.

11. A computer program product comprising a non-transitory computer readable storage medium having control logic stored therein for causing a computer to correct a predicted location, the control logic comprising:

a first computer readable program code that identifies a first region and a first routing identifier of a first location associated with a location correction for a user;

a second computer readable program code that stores the first location, the first routing identifier, and the first region;

a third computer readable program code that receives a location request for a current location of the user from a map application and identifies a second routing identifier associated with the location request;

a fourth computer readable program code that predicts a second location based at least in part on a comparison of the first routing identifier and the second routing identifier;

a fifth computer readable program code that responds to the location request with the second location; and a sixth computer readable program code that:

calculates a second region associated with the location request based at least in part on information associated with the location request;

wherein the fourth computer readable program code is configured to:

compare the first routing identifier to the second routing identifier;

compare the first region to the second region:

calculate the second location based on the first location when the first routing identifier matches the second routing identifier and the first region matches the second region;

calculate the second location based on information associated with the location request when the first routing identifier does not match the second routing identifier or the first region does not match the second region; and automatically correct the second location based on the region comparison and the routing identifier comparison to provide additional accuracy to the location correction.

* * * * *